United States Patent
Gaylor et al.

(10) Patent No.: US 7,860,617 B1
(45) Date of Patent: Dec. 28, 2010

(54) GEOSYNCHRONOUS SPACECRAFT AUTONOMOUS NAVIGATION

(75) Inventors: David Gaylor, Edgewater, MD (US); William Bamford, Severna Park, MD (US); Neil E. Goodzeit, Princeton, NJ (US); Harald J. Weigl, Doylestown, PA (US)

(73) Assignees: Lockheed Martin Corporation, Bethesda, MD (US); Emergent Space Technologies, Inc., Greenbelt, MD (US)

( * ) Notice: Subject to any disclaimer, the term of this patent is extended or adjusted under 35 U.S.C. 154(b) by 416 days.

(21) Appl. No.: 11/878,359

(22) Filed: Jul. 24, 2007

(51) Int. Cl.
G05D 1/00 (2006.01)

(52) U.S. Cl. .......................... 701/13; 701/206; 701/210

(58) Field of Classification Search .............. 244/158.4, 244/164, 165; 702/176; 701/213, 214
See application file for complete search history.

(56) References Cited

U.S. PATENT DOCUMENTS

| | | | | |
|---|---|---|---|---|
| 4,770,841 A * | 9/1988 | Haley et al. | ................. | 376/216 |
| 4,783,744 A * | 11/1988 | Yueh | ......................... | 701/221 |
| 5,075,693 A * | 12/1991 | McMillan et al. | ........... | 342/457 |
| 5,325,098 A * | 6/1994 | Blair et al. | ..................... | 342/95 |
| 5,339,684 A * | 8/1994 | Jircitano et al. | ........... | 73/178 R |
| 5,583,774 A * | 12/1996 | Diesel | ........................ | 701/200 |
| 5,654,907 A * | 8/1997 | Lange | ........................ | 702/104 |
| 6,047,226 A * | 4/2000 | Wu et al. | ...................... | 701/13 |
| 6,408,245 B1 * | 6/2002 | An et al. | ...................... | 701/216 |
| 6,480,152 B2 * | 11/2002 | Lin et al. | .............. | 342/357.14 |
| 6,647,352 B1 * | 11/2003 | Horton | ....................... | 702/151 |
| 6,721,657 B2 * | 4/2004 | Ford et al. | .................. | 701/213 |
| 6,845,938 B2 * | 1/2005 | Muravez | .................... | 244/3.11 |
| 6,859,170 B2 * | 2/2005 | Devereux et al. | ...... | 342/357.06 |
| 2002/0008661 A1 * | 1/2002 | McCall et al. | ......... | 342/357.14 |
| 2005/0114023 A1 * | 5/2005 | Williamson et al. | ......... | 701/214 |
| 2005/0240347 A1 * | 10/2005 | Yang | .......................... | 701/220 |
| 2006/0208941 A1 * | 9/2006 | Ring et al. | ............. | 342/357.02 |
| 2006/0224321 A1 * | 10/2006 | Lund et al. | ................... | 701/220 |
| 2008/0037614 A1 * | 2/2008 | Douglas | ..................... | 375/150 |
| 2008/0133135 A1 * | 6/2008 | DiEsposti et al. | ........... | 701/226 |

(Continued)

OTHER PUBLICATIONS

Skipper et al.; Autonomous Reconstruction and Calibration of GEO Stationkeeping Maneuvers; AIAA-2006-5590; SpaceOps 2006 Conference; Jun. 19-23, 2006; Rome, Italy.*

(Continued)

*Primary Examiner*—Timothy D Collins
*Assistant Examiner*—Justin Benedik
(74) *Attorney, Agent, or Firm*—McDermott Will & Emery LLP

(57) ABSTRACT

A spacecraft system is provided, including a measurement device configured to measure information associated with position of a spacecraft, a filter configured to process the measured information and to provide estimated pre-maneuver information associated with position of the spacecraft and estimated post-maneuver information associated with position of the spacecraft, a propagator configured to predict post-maneuver information associated with position of the spacecraft based upon the estimated pre-maneuver information associated with position of the spacecraft and a model of a maneuver of the spacecraft, an error calculator configured to calculate an acceleration error based upon the estimated post-maneuver information associated with position of the spacecraft and the predicted post-maneuver information associated with position of the spacecraft, and a maneuver archive configured to store the acceleration error for updating the model of the maneuver. The filter, the propagator, the error calculator and the maneuver archive may be implemented in software and/or onboard the spacecraft.

24 Claims, 7 Drawing Sheets

U.S. PATENT DOCUMENTS

2009/0048779 A1* 2/2009 Zeng et al. .................. 701/214

OTHER PUBLICATIONS

Woodburn et al.; Estimation of Instantaneous Maneuvers Using A Fixed Interval Smoother; Advances in the Astronautical Sciences; 2004; pp. 243-260; vol. 116; Part I.

Carrico et al.; Maneuver Planning and Results for Clementine (The Deep Space Program Science Experiment); Paper No. AAS 95-129; AAS/AIAA Spaceflight Mechanics Meeting; Feb. 1995; pp. 477-499; Albuquerque, NM.

Skipper et al.; Autonomous Reconstruction and Calibration of GEO Stationkeeping Maneuvers; AIAA-2006-5590; SpaceOps 2006 Conference; Jun. 19-23, 2006; Rome, Italy.

* cited by examiner

GEOSYNCHRONOUS SPACECRAFT AUTONOMOUS NAVIGATION

CROSS-REFERENCE TO RELATED APPLICATION

Not applicable.

STATEMENT REGARDING FEDERALLY SPONSORED RESEARCH OR DEVELOPMENT

Not applicable.

FIELD OF THE INVENTION

The present invention generally relates to spacecraft navigation and, in particular, relates to autonomous navigation systems and methods for geosynchronous spacecraft.

BACKGROUND OF THE INVENTION

Geosynchronous ("GEO") spacecraft are frequently used for applications in which high-accuracy orbital position knowledge is necessary. For example, high accuracy pointing is needed for spacecraft that include celestial-inertial attitude determination systems using star trackers. Also, high accuracy orbit position information is needed for remote sensing applications, where precise instrument image navigation and registration ("INR") is required.

Such missions may require orbit position knowledge of 75 meter per axis or better, at all times including during and after thruster orbit control maneuvers. Furthermore, future spacecraft must operate autonomously, without ground commanding for extended periods, even during periods that include thruster maneuvers.

One approach to providing high accuracy orbit position information uses NAVSTAR Global Positioning System ("GPS") signals to determine the position and velocity of a spacecraft. In this approach, signals from four or more GPS satellites are used to compute the position and velocity of a spacecraft. However, because GEO spacecraft are well above the altitude of the GPS constellation, and the GPS satellite antennas are pointed toward the Earth, signals from four GPS satellites may not be continuously available to a GPS receiver in GEO. Therefore, an Extended Kalman Filter ("EKF") may be implemented to provide a continuous estimate of the position and velocity of the spacecraft, even when less than four GPS signals are available Using an EKF, such GPS-at-GEO systems can provide reasonably accurate performance, assuming they include suitably, designed antennas and receivers that can acquire and track the low-level spillover signals from the GPS satellites. To improve their performance, these systems may include a precision orbit model for modeling perturbation accelerations, such as the gravity effects due to the Earth, Sun, and Moon, as well as the solar pressure force. While these perturbations can be reasonably well modeled, difficulty occurs when thrusters are fired to change the spacecraft velocity or to adjust the momentum of the spacecraft reaction wheels. In these cases, there will be significant uncertainty in the orbital effect of the thruster firing due to, for example, thruster performance variability, plume impingement, and other propulsion and spacecraft uncertainties. In the presence of these uncertainties, it may not be possible to meet precision navigation requirements during or immediately following a maneuver when few GPS satellites are visible.

Thus, satellites using this approach rely upon ground-based calibration to account for the effects of thruster firing. The updated information may be periodically supplied to the spacecraft, to improve navigation performance during and after each maneuver. The drawback of this approach is that, because the calibration procedure is implemented on the ground, thruster model updates cannot be made during periods where the spacecraft must operate autonomously. Furthermore, the calibration procedures are labor intensive, increasing spacecraft operational cost. Also, calibrations must be maintained for all of the thruster sets, and care must be taken to ensure that correct information is uploaded to avoid a mistake that might disrupt mission operations. Finally, existing ground-based orbit determination calibration procedures are too computationally intensive to be suitable for implementation onboard the spacecraft.

SUMMARY OF THE INVENTION

The present invention solves the foregoing problems by automatically calibrating thruster combinations used for orbit and momentum adjust maneuvers. This calibration is performed automatically, using a computationally efficient algorithm, without ground intervention. The calibration information is updated after the use of each thruster set, so the most accurate information is available for the next maneuver using the same set. The improved accuracy thruster information enables navigation requirements to be met even for maneuvers performed when few GPS satellites are visible.

According to one embodiment of the present invention, a spacecraft system comprises a measurement device configured to measure information associated with position of a spacecraft, a filter configured to process the measured information and to provide estimated pre-maneuver information associated with position of the spacecraft and estimated post-maneuver information associated with position of the spacecraft, a propagator configured to predict post-maneuver information associated with position of the spacecraft based upon the estimated pre-maneuver information associated with position of the spacecraft and a model of a maneuver of the spacecraft, an error calculator configured to calculate an acceleration error based upon the estimated post-maneuver information associated with position of the spacecraft and the predicted post-maneuver information associated with position of the spacecraft, and a maneuver archive configured to store the acceleration error for updating the model of the maneuver.

According to another embodiment of the present invention, a system for calibrating spacecraft maneuvers comprises a processor configured to receive information associated with position of a spacecraft having one or more thrusters, to provide estimated pre-maneuver position-related information about the spacecraft and estimated post-maneuver position-related information about the spacecraft, to predict post-maneuver position-related information about the spacecraft based upon the estimated pre-maneuver position-related information about the spacecraft and a model of a maneuver of the spacecraft, the model of the maneuver of the spacecraft including performance information about the one or more thrusters, to calculate an acceleration error based upon the estimated post-maneuver position-related information about the spacecraft and the predicted post-maneuver position-related information about the spacecraft, and to update the model of the maneuver.

According to another embodiment of the present invention, a method for calibrating spacecraft maneuvers comprises the steps of generating, with a filter, estimated pre-maneuver information associated with position of a spacecraft, predicting, with a propagator, post-maneuver information associated with position of the spacecraft based upon the estimated pre-maneuver information associated with position and a model of a maneuver, performing the maneuver, generating, with the filter, estimated post-maneuver information associated with position of the spacecraft, calculating an acceleration error based upon a difference between the estimated post-maneuver information associated with position and the predicted post-maneuver information associated with position, and updating the model of the maneuver based upon the calculated acceleration error.

It is to be understood that both the foregoing summary of the invention and the following detailed description are exemplary and explanatory and are intended to provide further explanation of the invention as claimed.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention. In the drawings.

DETAILED DESCRIPTION OF THE INVENTION

In the following detailed description, numerous specific details are set forth to provide a full understanding of the present invention. It will be apparent, however, to one ordinarily skilled in the art that the present invention may be practiced without some of these specific details. In other instances, well-known structures and techniques have not been shown in detail to avoid unnecessarily obscuring the present invention.

Figure 1:
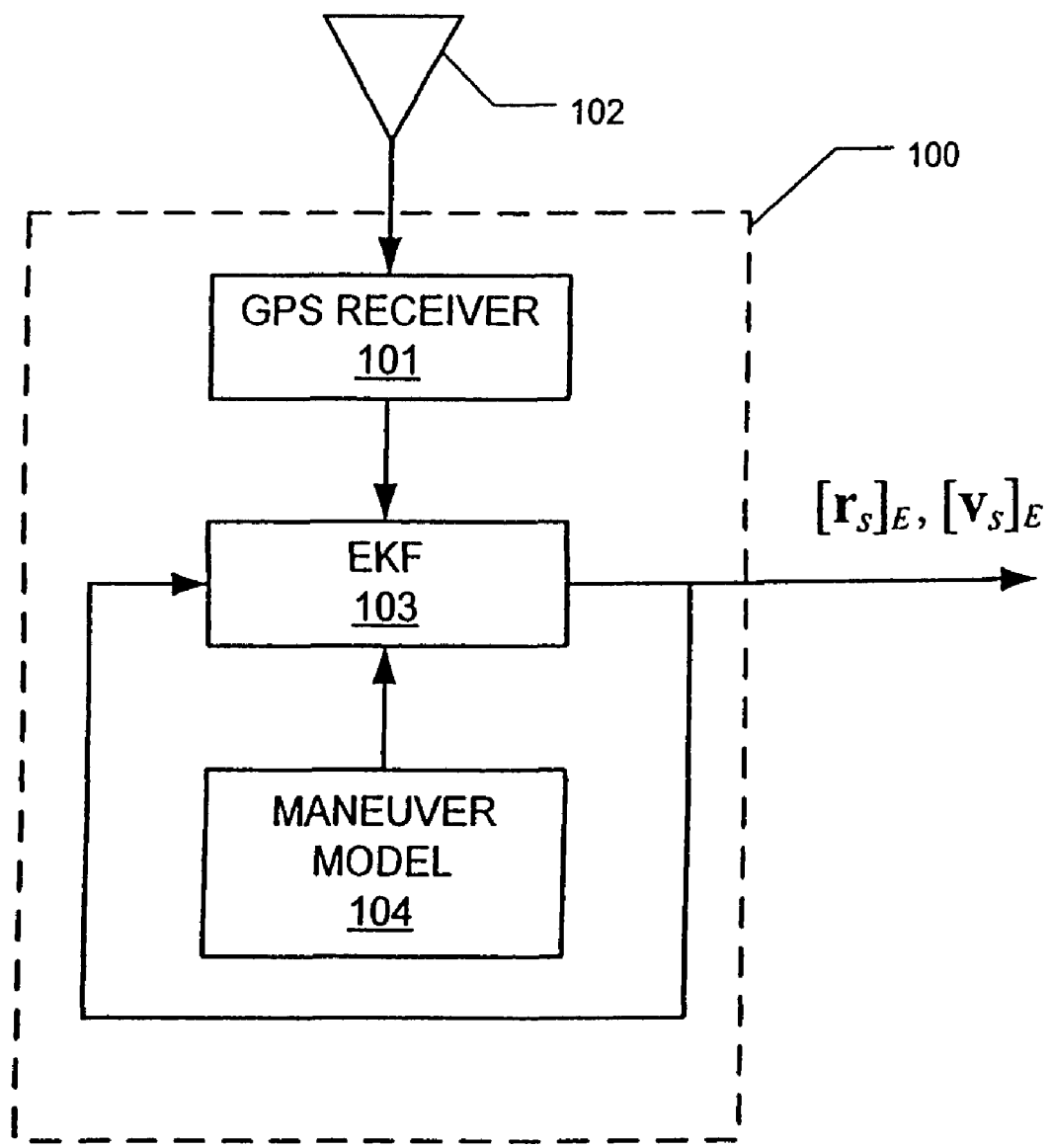
FIG. 1 illustrates a spacecraft with an onboard GPS navigation system.

FIG. 1 illustrates a spacecraft with an onboard GPS navigation system. The navigation system 100 consists of a GPS receiver 101 which receives GPS signals from an antenna 102, and which provides measured information about the position and velocity of a spacecraft (e.g., pseudorange measurements) to an Extended Kalman Filter ("EKF") 103. EKF 103 produces state estimates ($[r_s]_E$, $[v_s]_E$) at some frequency in real time or near real time. EKF 103 uses a simple maneuver model 104 to predict the effects of an orbit or momentum adjust maneuver on future position and velocity estimates. The only way in which errors in maneuver model 104 can be corrected is by using data uploaded from a ground station.

Figure 2:
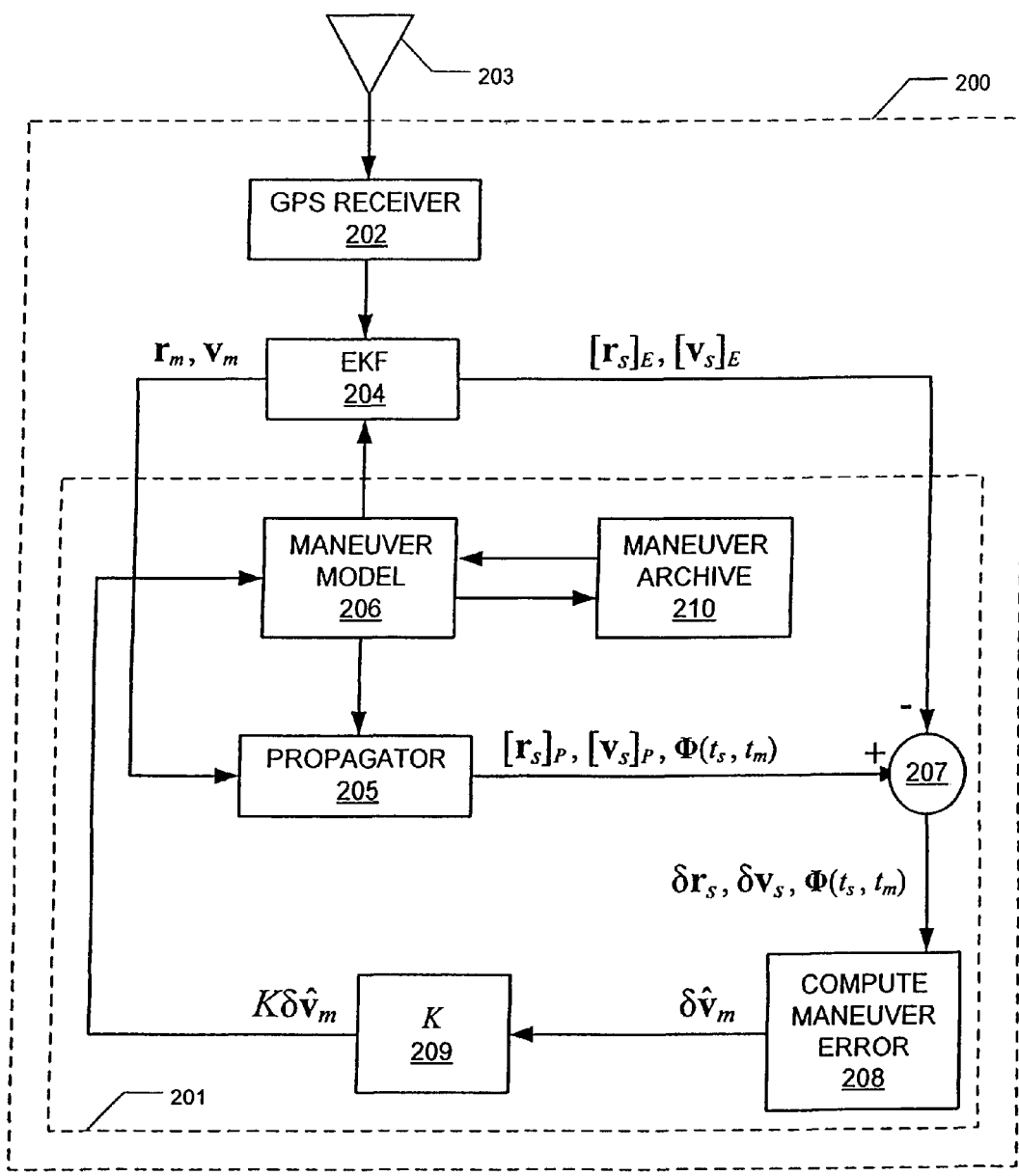
FIG. 2 illustrates a spacecraft with an onboard maneuver calibration system according to one embodiment of the present invention.

A spacecraft according to one embodiment of the present invention which overcomes this and other limitations is illustrated in FIG. 2. The spacecraft includes a GPS-at-GEO navigation system 200 with an onboard maneuver calibration system 201. Navigation system 200 includes a GPS receiver 202 which receives GPS signals from an antenna 203 and provides measured information about the position and velocity of the spacecraft (e.g., pseudorange measurements) to an EKF 204. EKF 204 processes GPS receiver pseudorange measurements prior to a maneuver to provide a pre-maneuver state estimate ($r_m$, $v_m$). The maneuver is initiated at time $t_m$. At this time, a high-fidelity orbit propagator 205 is initialized with the pre-maneuver state estimate from EKF 204. Propagator 205 integrates the equations of motion, including the predicted acceleration generated by the thruster firing from the maneuver model 206, forward to time $t_s$ to provide a predicted post-maneuver state ($[r_s]_P$, $[v_s]_P$).

Meanwhile, EKF 204 continues processing GPS receiver measurements throughout the maneuver, adding the maneuver uncertainty to the velocity sub-matrix of the covariance. GPS receiver measurements are processed by the EKF until the uncertainty in the state estimate returns to normal non-maneuver state uncertainty, which occurs at time $t_s$, and the EKF provides a post-maneuver state estimate ($[r_s]_E$, $[v_s]_E$).

At $t_s$, the difference between the predicted ($[r_s]_P$, $[v_s]_P$) and estimated ($[r_s]_E$, $[v_s]_E$) post-maneuver states, $\delta x$, is computed in functional block 207. Finally, the difference between the planned $\Delta v$ and the actual $\Delta v$ is computed in functional block 208 by using $\delta x$ and the state transition matrix, $\Phi(t_s, t_m)$, which transitions the state from $t_m$ to $t_s$ and which can be obtained from either EKF 204 or propagator 205. The derivation of the equations for this computation is provided in greater detail below.

The error $\delta v_m$ in the predicted $\Delta v$ is converted to acceleration error, as illustrated in greater detail below, which is used to update the thruster information that is stored in the maneuver archive 210. To provide filtering on the update of the maneuver error estimate, the maneuver error estimate is multiplied by a weighting variable K (illustrated in functional block 209) before it is used to update the information in the maneuver archive 210. For example, a value of 0.5 or 50% may be used for K so that only half of a maneuver error estimate is used to update the maneuver model at each maneuver. This process is performed for each maneuver until the maneuver error is negligibly small.

For clarity, the foregoing exemplary embodiment has been illustrated with a number of discrete functional blocks (e.g., 207, 208, 209). As will be apparent to one of skill in the art, these functions may be implemented in a single hardware component, multiple hardware components, software, firmware, or some combination thereof, in accordance with various aspects of the present invention. As will be described in greater detail below, some or all of the components of onboard navigation system 200 may be implemented in software, firmware, hardware, or the like, in accordance with various embodiments of the present invention.

According to various embodiments of the present invention, a different combination of thrusters, pulse widths and duty cycles may be used for each unique maneuver type, such as North/South stationkeeping, East/West stationkeeping, and reaction wheel assembly ("RWA") momentum adjust. The onboard maneuver calibration system 201 computes and maintains thruster modeling information in maneuver archive 210, so that the most precise information is available for each maneuver.

Figure 3:
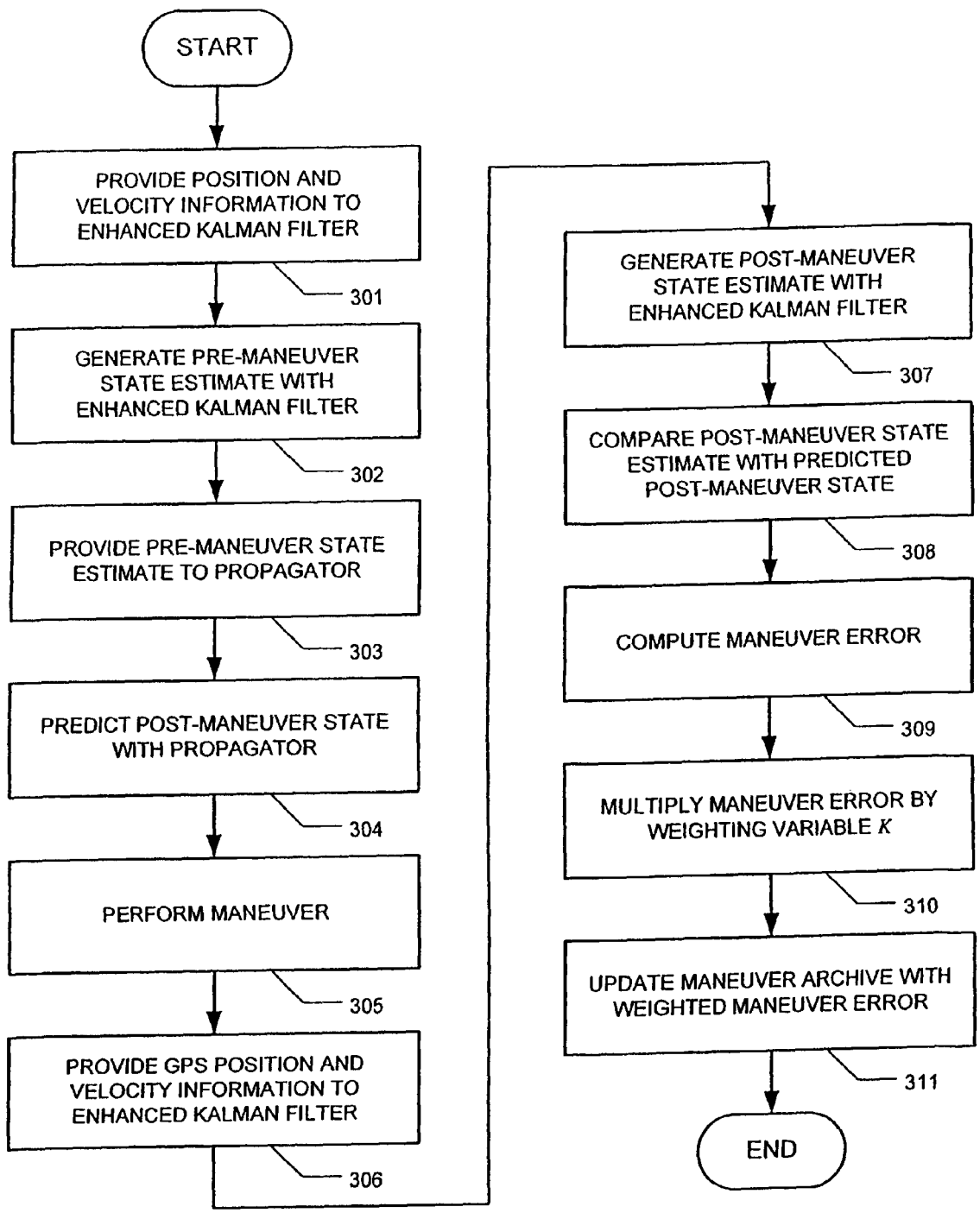
FIG. 3 is a flowchart illustrating a method for calibrating spacecraft maneuvers according to one embodiment of the present invention.

FIG. 3 is a flowchart illustrating a method for calibrating spacecraft maneuvers according to one embodiment of the present invention. The method begins in step 301, in which position and velocity information (e.g., from a GPS system, a ground-based tracking station, etc.) of a spacecraft, such as a geosynchronous spacecraft, is provided to an EKF. The EKF generates a pre-maneuver state estimate based upon this position and velocity information in step 302, which is provided in turn to a high-fidelity orbit propagator in step 303. The propagator predicts, based upon the pre-maneuver state estimate and a mathematical model of the maneuver to be performed, a post-maneuver state (i.e., position and velocity) of the spacecraft in step 304. In step 305, the maneuver is performed. In step 306, updated position and velocity of the spacecraft is provided to the EKF, which generates a post-maneuver state estimate in step 307. This post-maneuver state estimate is compared in step 308 to the predicted post-maneuver state generated in 304, and a maneuver error is computed in step 309, as described in greater detail below. This computation may be done in a computer system, as described in greater detail below, either onboard the spacecraft or in a ground-based computer. In step 310, the maneuver error is multiplied by a weighting variable K, in order to provide filtering on the update of the maneuver error estimate. In step 311, a maneuver archive is updated with the weighted maneuver error, so that a more precise maneuver model is available for the next maneuver.

Figure 4:
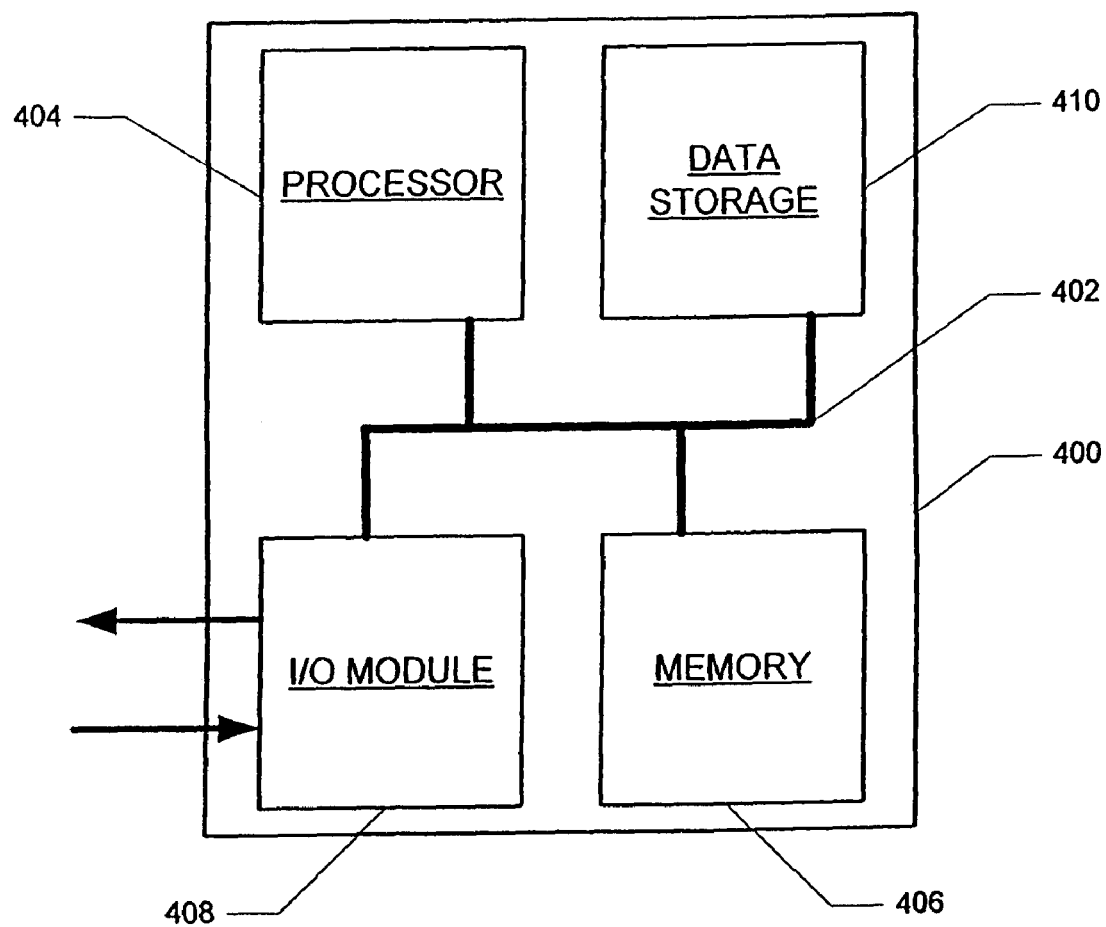
FIG. 4 is a block diagram that illustrates a computer system upon which one embodiment of the present invention may be implemented.

FIG. 4 is a block diagram that illustrates a computer system 400 upon which an embodiment of the present invention may be implemented. Computer system 400 includes a bus 402 or other communication mechanism for communicating information, and a processor 404 coupled with bus 402 for processing information. Computer system 400 also includes a memory 406, such as a random access memory ("RAM") or other dynamic storage device, coupled to bus 402 for storing information and instructions to be executed by processor 404. Memory 406 may also be used for storing temporary variables or other intermediate information during execution of instructions to be executed by processor 404. Computer system 400 further includes a data storage device 410, such as a magnetic disk or optical disk, coupled to bus 402 for storing information and instructions.

Computer system 400 may be coupled via I/O module 408 to a display device (not illustrated), such as a cathode ray tube ("CRT") or liquid crystal display ("LCD") for displaying information to a computer user. An input device, such as, for example, a keyboard or a mouse may also be coupled to computer system 400 via I/O module 408 for communicating information and command selections to processor 404.

According to one embodiment of the invention, maneuver calibration for a spacecraft is performed by a computer system 400 in response to processor 404 executing one or more sequences of one or more instructions contained in memory 406. Such instructions may be read into memory 406 from another machine-readable medium, such as data storage device 410. Execution of the sequences of instructions contained in main memory 406 causes processor 404 to perform the process steps described herein. One or more processors in a multi-processing arrangement may also be employed to execute the sequences of instructions contained in memory 406. In alternative embodiments, hard-wired circuitry may be used in place of or in combination with software instructions to implement the invention. Thus, embodiments of the invention are not limited to any specific combination of hardware circuitry and software.

According to various embodiments of the present invention, computer system 400 may be located onboard a spacecraft, or alternatively may be located on a ground station.

The term "machine-readable medium" as used herein refers to any medium that participates in providing instructions to processor 404 for execution. Such a medium may take many forms, including, but not limited to, non-volatile media, volatile media, and transmission media. Non-volatile media include, for example, optical or magnetic disks, such as data storage device 410. Volatile media include dynamic memory, such as memory 406. Transmission media include coaxial cables, copper wire, and fiber optics, including the wires that comprise bus 402. Transmission media can also take the form of acoustic or light waves, such as those generated during radio frequency and infrared data communications. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, a carrier wave, or any other medium from which a computer or other machine can read. The term "processor" as used herein refers to any device that can execute process steps, and may be comprised of one or more of hardware, firmware, or software.

Equation Derivation

The following presents details regarding the thruster maneuver calibration processing according to one embodiment of the present invention. The formulation uses linear perturbation theory to establish the relationship between the maneuver uncertainty and the difference between the predicted and estimated spacecraft orbital state at some time following the maneuver.

The equations of motion for a spacecraft can be expressed as:

$$\dot{x} = F(x,t) \tag{1}$$

where $x = [r \ v \ \beta]^T$, and x is the state vector containing three position (r) and three velocity (v) components expressed in the Earth Centered Inertial ("ECI") reference frame and $\beta$, which represents other parameters such as sensor biases and model coefficients that are to be solved for.

Equation (1) can be linearized by performing a Taylor series expansion about a reference state vector denoted by $x^*$:

$$\dot{x}(t) = \dot{x}^*(t) + \left[\frac{\partial \dot{x}(t)}{\partial x(t)}\right]^* (x(t) - x^*(t)) + \ldots \tag{2}$$

By ignoring higher-order terms and defining:

$$\delta x(t) = x(t) - x^*(t) \tag{3}$$

Equation (2) can be expressed as $$\delta \dot{x}(t) = \left[\frac{\partial \dot{x}(t)}{\partial x(t)}\right]^* \delta x(t) = A(t)\delta x(t) \tag{4}$$

which is a linear system of first-order differential equations with the following solution:

$$\delta x(t) = \Phi(t, t_0) \delta x(t_0) \tag{5}$$

where $\Phi(t, t_0)$ is referred to as the State Transition Matrix ("STM"). The STM obeys the following differential equation:

$$\dot{\Phi}(t, t_0) = A(t)\Phi(t, t_0) \tag{6}$$

with the following initial condition: $\Phi(t_0, t_0) = I$, the n×n identity matrix.

The challenge in maneuver calibration is determining the difference between the estimated and predicted maneuver velocity change. In the present exemplary embodiment, the maneuver is assumed to be an impulsive $\Delta v$ occurring at a time $t_m$. The difference between the observed and predicted velocity is denoted by $\delta v_m \equiv \delta v(t_m)$. Since the maneuver is assumed to be impulsive, $t_m$ may be the beginning of maneuver, the maneuver midpoint time, or some other time (e.g., the centroid time of the applied impulse). Using the EKF and the propagator state estimates, the difference between the observed and predicted state at a time $t_s$ may also be computed. In this case, $t_s$ is chosen to be a time following the maneuver when the EKF accuracy has returned to steady state. The relationship between the difference in the observed and predicted trajectories at these times can be expressed as:

$$\begin{bmatrix} \delta r_s \\ \delta v_s \end{bmatrix} = \Phi(t_s, t_m) \begin{bmatrix} \delta r_m \\ \delta v_m \end{bmatrix} \quad (7)$$

where the state transition matrix, $\Phi(t_s, t_m)$ is computed by numerically integrating Equation (6). Although the state transition matrix is computed in the EKF for each time step, Equation (6) is, in this example, integrated along with the spacecraft equations of motion in the propagator for ease of implementation. Either choice is valid and would lead to the desired result.

Defining 3×3 partitions of the state transition matrix as:

$$\Phi(t_s, t_m) = \begin{bmatrix} \tilde{R} & R \\ \tilde{V} & V \end{bmatrix} \quad (8)$$

allows Equation (7) to be written as the following two equations:

$$\delta r_s = \tilde{R}\delta r_m + R\delta v_m \quad (9)$$

$$\delta v_s = \tilde{V}\delta r_m + V\delta v_m \quad (10)$$

Solving Equation (9) for $\delta r_m$ leads to:

$$\delta r_m = \tilde{R}^{-1}[\delta r_s - R\delta v_m] \quad (11)$$

Substituting this into Equation (10) leads to:

$$\delta v_s = \tilde{V}\tilde{R}^{-1}\delta r_s + [V - \tilde{V}\tilde{R}^{-1}R]\delta v_m \quad (12)$$

Solving for $\delta v_m$, $$\delta v_m = [V - \tilde{V}\tilde{R}^{-1}R]^{-1}[\delta v_s - \tilde{V}\tilde{R}^{-1}\delta r_s] \quad (13)$$

This is the error in the $\Delta v$ predicted by the maneuver model based on the difference between the maneuver model's predicted position and velocity at $t_s$ and the observed position and velocity at that time. The error $\delta v_m$ is computed in the ECI frame. It is then rotated to the spacecraft radial, in-track, cross-track ("RIC") frame (the spacecraft orbital frame) at time $t_m$.

According to one aspect of the present invention, in order to provide filtering on the update of the maneuver error estimate, the correction applied to the maneuver model for the next maneuver is based on a fraction K of the $\delta v_m$ computed. Based on the maneuver duration, the correction may be converted into an acceleration error as:

$$\Delta a = \frac{K\delta v_m}{\text{maneuver duration}} \quad (14)$$

This acceleration correction is used to update the thruster model, which is then used to predict the velocity change for the next maneuver.

Exemplary Simulation

A navigation simulation has been developed according to one aspect of the present invention. The simulation models an EKF which processes measurements from a GPS receiver with a signal-to-noise ("C/N$_0$") acquisition threshold of 30 dB-Hz and tracking threshold of 27 dB-Hz in a GEO orbit (these thresholds are representative of the capability of existing hardware). Additionally, a 4 dB-Hz penalty is levied upon the receiver to account for unmodeled system error sources including, for example, variation in the sidelobe patterns due to blockages, multi-path, etc. The true spacecraft trajectory is generated with a 20×20 JGM2 gravity model, and includes luni-solar gravitation effects and solar radiation pressure perturbations. The EKF uses a 4×4 gravity model, solar radiation pressure model, and luni-solar gravity model, that are less precise than those used to create the true trajectory. The filter state includes of the receiver's position, velocity, clock bias and drift, and a solar radiation pressure constant offset.

The modeled GPS constellation includes 24 block IIR-M space vehicles using a YUMA file from June 2001. GPS receiver pseudorange measurements are constructed from the true range, and include the effects of receiver noise and GPS space vehicle clock and ephemeris errors. Additionally, yaw angles for each GPS space vehicle are calculated at each time step to accurately simulate the variations in the signal strength from the broadcasting gain pattern. The simulation environment uses these signal strengths to calculate the C/N$_0$ values at the receiver antenna, which determine whether or not the signal has enough energy to be acquired and tracked by the receiver.

In this simulation, maneuvers are performed every 24 hours, and are 45 minutes in duration. The maneuver error is modeled as the sum of two components: (1) a repeatable maneuver error which the maneuver calibration system is attempting to estimate, and (2) a random component that varies with each maneuver. Table 1, below, gives the repeatable maneuver error. The random component is created by including an additional randomly-generated acceleration with a standard deviation equal to 20% of the total maneuver uncertainty. To provide filtering on the update of the maneuver error estimate, a value of 0.5 or 50% is used for K so that only part of a maneuver error estimate is used to update the maneuver model at each maneuver. This process is performed for each maneuver until the maneuver error is negligibly small.

TABLE 1

Repeatable Maneuver Parameters

| Direction | Truth (m/s$^2$) | Filter Model (m/s$^2$) | Error (%) |
|---|---|---|---|
| R | 0.0045 | 0.00 | — |
| I | 0.0045 | 0.00 | — |
| C | 0.3800 | 0.36 | 5 |

While the value 0.5 has been used for K in the present exemplary performance analysis, the scope of the present invention is not limited to such an arrangement. Rather, as will be apparent to one of skill in the art, any positive, non-zero value for K may be used to modify the impact that a given maneuver error estimate has on the maneuver model. For example, according to various aspects of the present invention, values such as 0.1, 0.25, 0.33, 0.66, 0.75, or even 1.0 may be used. According to another embodiment of the invention, in which it is desirable for a particular maneuver estimate to have an increased effect on the maneuver model, values of K larger than 1.0 may be used as well.

Figure 5:
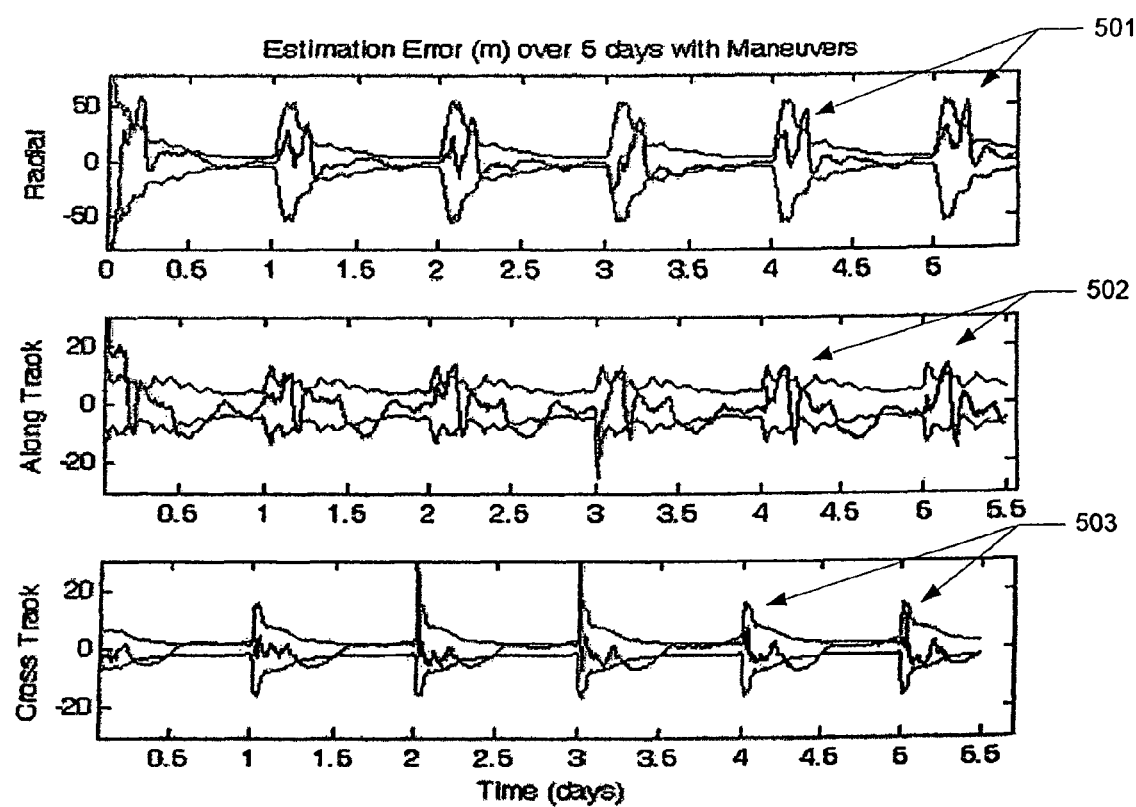
FIGS. 5 to 7 are graphs illustrating advantages enjoyed by various embodiments of the present invention.

FIG. 5 depicts the estimation errors which occur over a period of 5 days in which the maneuver calibration algorithm is not utilized. As can be seen with reference to FIG. 5, radial errors 501 are consistently near 50 meters immediately following each maneuver (which occur at 1-day intervals). The effects of the random maneuver errors can also be readily visualized in the along track (502) and cross track (503) errors plots.

Figure 6:
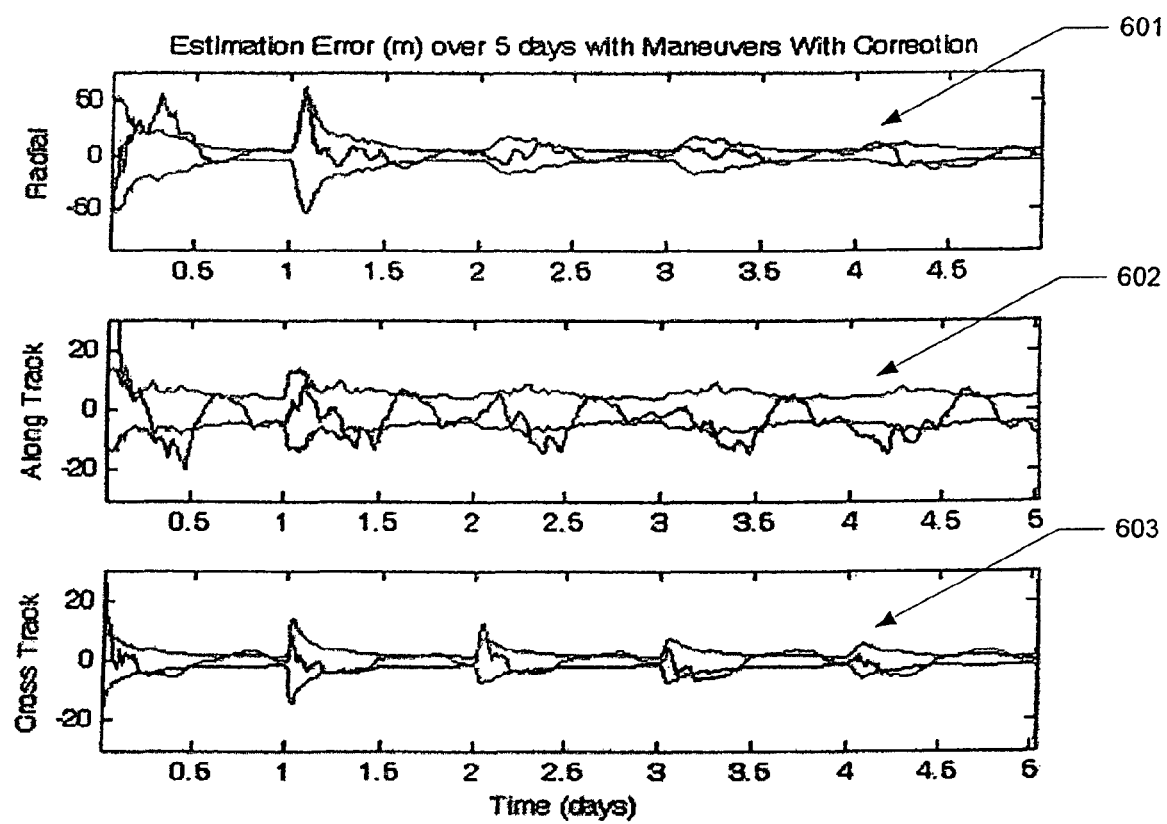

FIG. 6 illustrates the estimation errors which occur over a period of 5 days in which the maneuver calibration algorithm is utilized according to one embodiment of the present invention. As can be seen with reference to FIG. 6, by the fourth orbit (and the fourth maneuver), the error caused by maneuver uncertainty has been reduced by about 60% in the radial direction (601). Errors in the along track (602) and cross track (603) directions have also been diminished, as is illustrated with reference to Table 2, below.

TABLE 2

Maximum Navigation Errors after 3 Maneuvers

| Direction | No Correction (m) | W/ Correction (m) | Improvement (m) | Improvement (%) |
|---|---|---|---|---|
| R | 51 | 19 | 32 | 63 |
| I | 28 | 15 | 13 | 46 |
| C | 40 | 11 | 29 | 73 |

Figure 7:
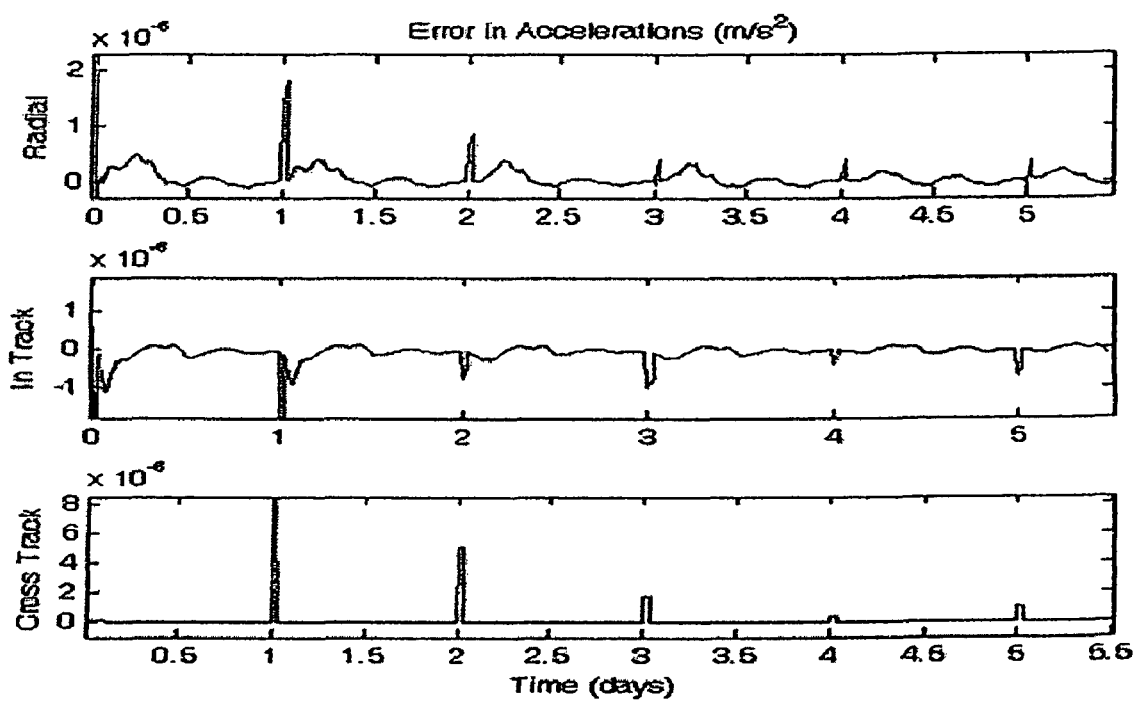

These results are further reinforced by FIG. 7, which highlights the differences between the true accelerations and the modeled accelerations throughout the simulation, according to one embodiment of the present invention. The large spikes occur during the maneuvers. As is readily apparent with respect to FIG. 7, the maneuver compensation algorithm can quickly and accurately calibrate the maneuver errors with very little overshoot. The residual spikes after the fourth day are residuals due to the random component of the maneuver, whose effect cannot (by definition) be estimated.

While the present invention has been particularly described with reference to the various figures and embodiments, it should be understood that these are for illustration purposes only and should not be taken as limiting the scope of the invention. There may be many other ways to implement the invention. Many changes and modifications may be made to the invention, by one having ordinary skill in the art, without departing from the spirit and scope of the invention.

What is claimed is:

1. A spacecraft system comprising:
a measurement device configured to measure information associated with position of a spacecraft;
a filter configured to process the measured information and to provide estimated pre-maneuver information associated with position of the spacecraft and estimated post-maneuver information associated with position of the spacecraft;
a propagator configured to predict post-maneuver information associated with position of the spacecraft based upon the estimated pre-maneuver information associated with position of the spacecraft and a model of a maneuver of the spacecraft;
an error calculator configured to calculate an acceleration error using a state transition matrix, the acceleration error based upon the estimated post-maneuver information associated with position of the spacecraft and the predicted post-maneuver information associated with position of the spacecraft; and
a maneuver archive configured to store the acceleration error for updating the model of the maneuver,
wherein the state transition matrix is identified by $\Phi(t_s,t_m)$ and satisfies the following relationship:

$$\begin{bmatrix} \delta r_s \\ \delta v_s \end{bmatrix} = \Phi(t_s, t_m) \begin{bmatrix} \delta r_m \\ \delta v_m \end{bmatrix},$$

where
$t_m$ is the time of the maneuver of the spacecraft,
$t_s$ is a time after the maneuver of the spacecraft,
$\delta r_s$ is a difference between observed and predicted positions of the spacecraft at $t_s$,
$\delta v_s$ is a difference between observed and predicted velocities of the spacecraft at $t_s$,
$\delta r_m$ is a difference between observed and predicted positions of the spacecraft at $t_m$, and
$\delta v_m$ is a difference between observed and predicted velocities of the spacecraft at $t_m$.

2. The spacecraft system of claim 1, wherein each of the measured information, the estimated pre-maneuver information, the estimated post-maneuver information and the predicted post-maneuver information includes one or more of: a position of the spacecraft and a velocity of the spacecraft.

3. The spacecraft system of claim 1, wherein the filter is an Extended Kalman Filter ("EKF").

4. The spacecraft system of claim 1, wherein the propagator is an orbital propagator.

5. The spacecraft system of claim 1, wherein the filter, the propagator, the error calculator and the maneuver archive are implemented in software.

6. The spacecraft system of claim 1, further comprising the spacecraft.

7. The spacecraft system of claim 1, wherein the filter, the propagator, the error calculator and the maneuver archive are implemented onboard the spacecraft.

8. The spacecraft system of claim 1, wherein the spacecraft is in a geosynchronous orbit.

9. The spacecraft system of claim 1, wherein the measurement device is a GPS receiver onboard the spacecraft.

10. The spacecraft system of claim 1, wherein the error calculator is further configured to multiply the acceleration error by a weighting variable K before the model of the maneuver is updated.

11. The spacecraft system of claim 10, wherein K is between 0.25 and 0.75.

12. The spacecraft system of claim 1, wherein the spacecraft includes one or more thrusters, and wherein the model of the maneuver includes performance information about the one or more thrusters.

13. A system for calibrating spacecraft maneuvers comprising a processor configured to receive information associated with position of a spacecraft having one or more thrusters, to provide estimated pre-maneuver position-related information about the spacecraft and estimated post-maneuver position-related information about the spacecraft, to predict post-maneuver position-related information about the spacecraft based upon the estimated pre-maneuver position-related information about the spacecraft and a model of a maneuver of the spacecraft, the model of the maneuver of the spacecraft including performance information about the one or more thrusters, to calculate an acceleration error using a state transition matrix, and to update the model of the maneuver, wherein the acceleration error is based upon the estimated post-maneuver position-related information about the spacecraft and the predicted post-maneuver position-related information about the spacecraft, wherein the state transition matrix is identified by $\Phi(t_s,t_m)$ and satisfies the following relationship:

$$\begin{bmatrix} \delta r_s \\ \delta v_s \end{bmatrix} = \Phi(t_s, t_m) \begin{bmatrix} \delta r_m \\ \delta v_m \end{bmatrix},$$

where $t_m$ is the time of the maneuver of the spacecraft,
$t_s$ is a time after the maneuver of the spacecraft,
$\delta r_s$ is a difference between observed and predicted positions of the spacecraft at $t_s$,
$\delta v_s$ is a difference between observed and predicted velocities of the spacecraft at $t_s$,
$\delta r_m$ is a difference between observed and predicted positions of the spacecraft at $t_m$, and
$\delta v_m$ is a difference between observed and predicted velocities of the spacecraft at $t_m$.

14. The system of claim 13, wherein the information associated with position of about the spacecraft includes one or more of: a position of the spacecraft and a velocity of the spacecraft.

15. A method for calibrating spacecraft maneuvers, comprising the steps of:
generating, with a filter, estimated pre-maneuver information associated with position of a spacecraft;
predicting, with a propagator, post-maneuver information associated with position of the spacecraft based upon the estimated pre-maneuver information associated with position and a model of a maneuver;
performing the maneuver;
generating, with the filter, estimated post-maneuver information associated with position of the spacecraft;
calculating an acceleration error using a state transition matrix, the acceleration error based upon a difference between the estimated post-maneuver information associated with position and the predicted post-maneuver information associated with position; and
updating the model of the maneuver based upon the calculated acceleration error,
wherein the state transition matrix is identified by $\Phi(t_s,t_m)$ and satisfies the following relationship:

$$\begin{bmatrix} \delta r_s \\ \delta v_s \end{bmatrix} = \Phi(t_s, t_m) \begin{bmatrix} \delta r_m \\ \delta v_m \end{bmatrix},$$

where $t_m$ is the time of the maneuver of the spacecraft,
$t_s$ is a time after the maneuver of the spacecraft,
$\delta r_s$ is a difference between observed and predicted positions of the spacecraft at $t_s$,
$\delta v_s$ is a difference between observed and predicted velocities of the spacecraft at $t_s$,
$\delta r_m$ is a difference between observed and predicted positions of the spacecraft at $t_m$, and
$\delta v_m$ is a difference between observed and predicted velocities of the spacecraft at $t_m$.

16. The method of claim 15, wherein each of the estimated pre-maneuver information, the estimated post-maneuver information and the predicted post-maneuver information includes one or more of: a position of the spacecraft and a velocity of the spacecraft.

17. The method of claim 15, wherein the filter is an Extended Kalman Filter ("EKF").

18. The method of claim 15, wherein the propagator is an orbital propagator.

19. The method of claim 15, wherein the estimated pre-maneuver position and velocity information and the estimated post-maneuver position and velocity information are generated based on GPS receiver measurements of position and velocity of the spacecraft.

20. The method of claim 15, wherein the filter and the propagator are implemented in software.

21. The method of claim 15, wherein the filter and the propagator are implemented onboard the spacecraft.

22. The method of claim 15, wherein the calculating the acceleration error and the updating the model are performed onboard the spacecraft.

23. The method of claim 15, wherein updating the model of the maneuver includes modifying the model by a weighting fraction K of the calculated acceleration error.

24. The method of claim 15, wherein the model of the maneuver includes performance information about one or more thrusters of the spacecraft.

* * * * *